(12) United States Patent
Ryu

(10) Patent No.: US 11,235,810 B2
(45) Date of Patent: Feb. 1, 2022

(54) VEHICLE REAR STRUCTURE

(71) Applicants: HYUNDAI MOTOR COMPANY, Seoul (KR); KIA MOTORS CORPORATION, Seoul (KR)

(72) Inventor: Se Ho Ryu, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 330 days.

(21) Appl. No.: 16/588,542

(22) Filed: Sep. 30, 2019

(65) Prior Publication Data

US 2020/0269933 A1  Aug. 27, 2020

(30) Foreign Application Priority Data

Feb. 22, 2019  (KR) ........................ 10-2019-0021159

(51) Int. Cl.
| | |
|---|---|
| *B62D 25/02* | (2006.01) |
| *B60L 50/60* | (2019.01) |
| *B62D 27/06* | (2006.01) |
| *B60K 6/28* | (2007.10) |
| *B60L 50/64* | (2019.01) |
| *B62D 25/20* | (2006.01) |

(52) U.S. Cl.
CPC ............. *B62D 25/025* (2013.01); *B60K 6/28* (2013.01); *B60L 50/64* (2019.02); *B60L 50/66* (2019.02); *B62D 25/2027* (2013.01); *B62D 27/065* (2013.01)

(58) Field of Classification Search
CPC . B60K 6/28; B60L 50/50; B60L 50/60; B60L 50/66; B62D 25/025; B62D 25/08; B62D 25/2027; B62D 25/2036; B62D 27/065
USPC .......... 296/193.07, 203.03, 203.04, 204, 209
See application file for complete search history.

(56) References Cited

U.S. PATENT DOCUMENTS

| | | | |
|---|---|---|---|
| 10,377,218 B1 * | 8/2019 | Pachore ................. | B62D 25/08 |
| 2006/0202519 A1 * | 9/2006 | Latimer ............. | B62D 25/2027 |
| | | | 296/203.04 |
| 2018/0186227 A1 * | 7/2018 | Stephens ................ | B62D 21/15 |
| 2019/0031241 A1 * | 1/2019 | Ayukawa ............... | B60J 5/0427 |
| 2019/0100090 A1 * | 4/2019 | Matecki ................. | B60L 50/66 |

(Continued)

FOREIGN PATENT DOCUMENTS

DE    102017210025 A1 *  5/2018  ......... B62D 25/2027

*Primary Examiner* — Jason S Daniels
(74) *Attorney, Agent, or Firm* — Morgan, Lewis & Bockius LLP

(57) ABSTRACT

A vehicle rear structure includes: a pair of side sills mounted on both sides of a floor panel; a pair of rear side members coupled to the pair of side sills, respectively; and a reinforcing member mounted in an inside of each side sill. A front end of each rear side member is coupled to a rear end of each side sill, each rear side member has a front portion aligned with each side sill, respectively, the reinforcing member has a length extending from the inside of each side sill to an inside of the front portion of each rear side member, respectively, a battery housing of a battery assembly is coupled to the pair of side sills and the reinforcing member by a first bolt, and the battery housing of the battery assembly is coupled to the pair of rear side members and the reinforcing member by a second bolt.

8 Claims, 5 Drawing Sheets

(56) References Cited

U.S. PATENT DOCUMENTS

| | | | |
|---|---|---|---|
| 2019/0144038 A1* | 5/2019 | Takahashi | B62D 25/2027 296/193.07 |
| 2019/0276082 A1* | 9/2019 | Tatsuwaki | B62D 25/087 |
| 2020/0148271 A1* | 5/2020 | Kim | B62D 21/152 |

* cited by examiner

VEHICLE REAR STRUCTURE

CROSS-REFERENCE TO RELATED APPLICATION

This application is based on and claims the benefit of priority to Korean Patent Application No. 10-2019-0021159, filed on Feb. 22, 2019, in the Korean Intellectual Property Office, the disclosure of which is incorporated herein in its entirety by reference.

TECHNICAL FIELD

The present disclosure relates to a vehicle rear structure, and more particularly, to a vehicle rear structure capable of improving rear crashworthiness and noise, vibration, and harshness (NVH) performance, and allowing a battery assembly to be firmly mounted under a floor panel of a vehicle.

BACKGROUND

Recently, as the perception of environmental crisis and depletion of oil resources has increased, research and development of eco-friendly electric vehicles have actively been conducted. Electric vehicles include a plug-in hybrid electric vehicle (PHEV), a battery electric vehicle (BEV), a fuel cell electric vehicle (FCEV), etc.

An electric vehicle may be equipped with a battery assembly which is mounted under a floor panel of a vehicle body. A pair of side sills may be mounted on both sides of the floor panel, and a pair of rear side members may be connected to the pair of side sills, respectively.

The rear side member and the side sill have different cross sections, and accordingly a front end of the rear side member may be connected to a rear end of the side sill through a bracket. The bracket may be laterally welded to the front end of the rear side member and the rear end of the side sill so that the front end of the rear side member may be coupled to the rear end of the side sill.

A conventional electric vehicle suffers from excessive deformation of the vehicle body due to weld fracture between the rear side member and the side sill during a rear impact, which reduces rear crashworthiness.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle rear structure capable of improving rear crashworthiness and NVH performance, and allowing a battery assembly to be firmly mounted under a floor panel of a vehicle.

According to an aspect of the present disclosure, a vehicle rear structure may include: a pair of side sills mounted on both sides of a floor panel; a pair of rear side members coupled to the pair of side sills, respectively; and a reinforcing member mounted in an inside of each side sill, wherein a front end of each rear side member is coupled to a rear end of each side sill, each rear side member has a front portion aligned with each side sill, respectively, the reinforcing member has a length extending from the inside of each side sill to an inside of the front portion of each rear side member, respectively, a battery housing of a battery assembly is coupled to the pair of side sills and the reinforcing member by a first bolt, and the battery housing of the battery assembly is coupled to the pair of rear side members and the reinforcing member by a second bolt.

The battery housing may include a first side mounting extending toward the side sill, and a second side mounting extending toward the rear side member. The first side mounting may be coupled to the side sill and the reinforcing member by the first bolt, and the second side mounting may be coupled to the rear side member and the reinforcing member by the second bolt.

The reinforcing member may include a plurality of through holes, and a plurality of cylindrical nuts coupled to the plurality of through holes, respectively.

The first side mounting may have a first through hole through which the first bolt passes, and the first bolt may pass through the first through hole and be fastened to a cylindrical nut aligned with the first through hole.

The second side mounting may have a second through hole through which the second bolt passes, and the second bolt may pass through the second through hole and be fastened to a cylindrical nut aligned with the second through hole.

Each cylindrical nut may include a cylindrical portion passing through each through hole of the reinforcing member, and a head portion formed on a bottom end of the cylindrical portion. The cylindrical portion may be coupled to the through hole of the reinforcing member, and the head portion may be coupled to a bottom surface of the reinforcing member adjacent to the through hole.

The front portion of the rear side member may have the same cross section as that of the side sill.

The front end of the rear side member may be butted and joined to the rear end of the side sill.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
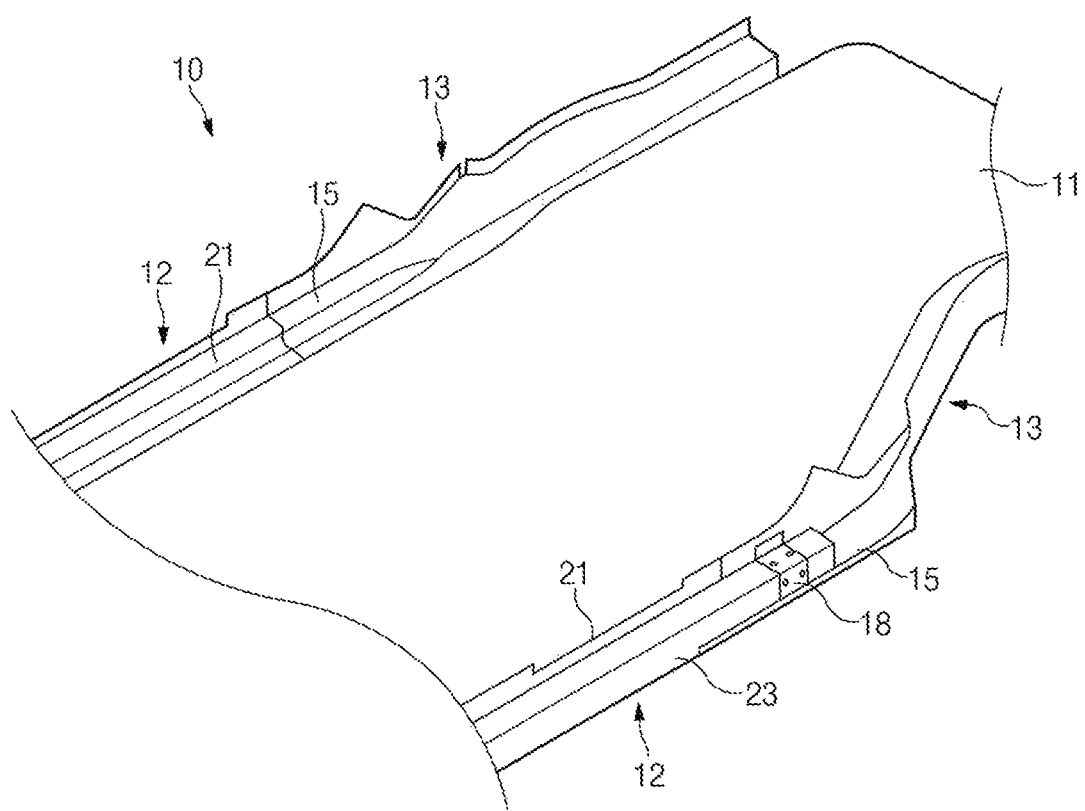
FIG. 1 illustrates a perspective view of a vehicle rear structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
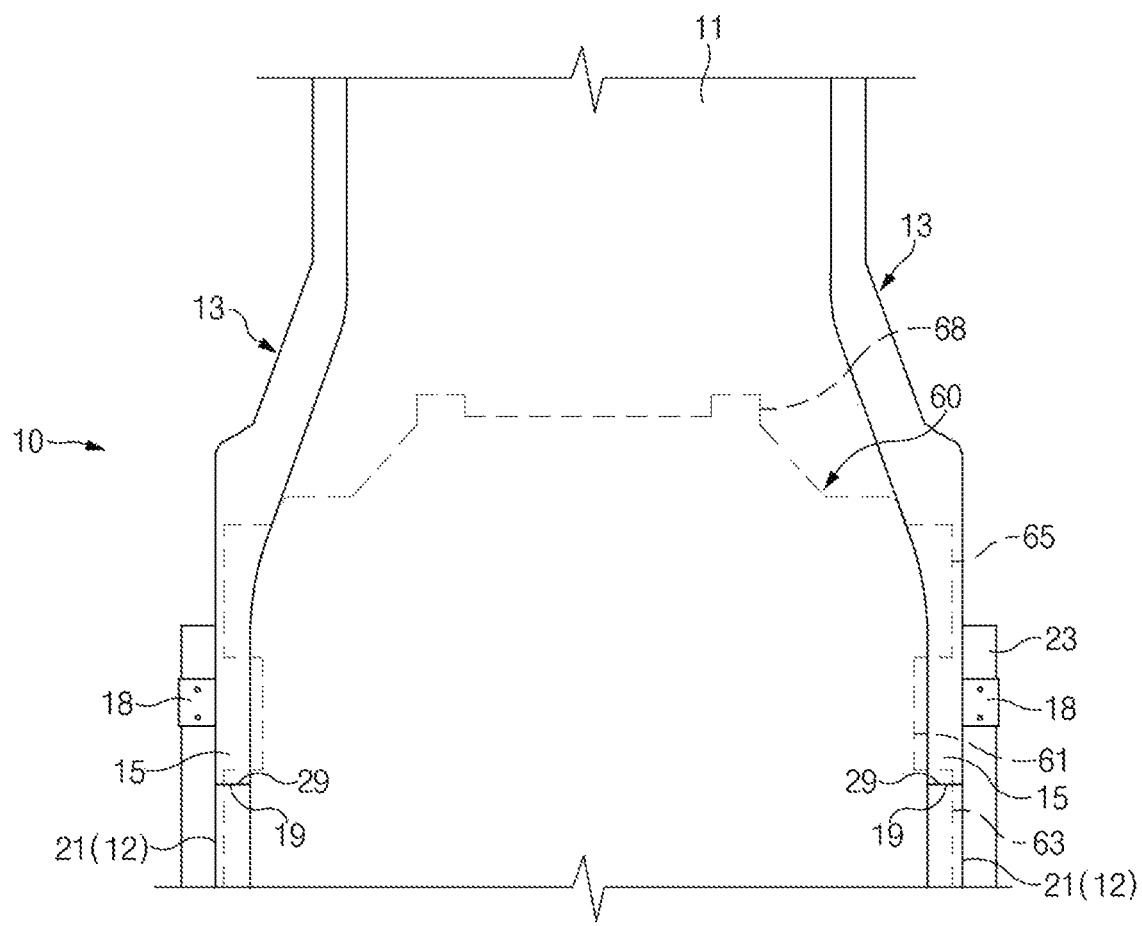
FIG. 2 illustrates a plan view of a vehicle rear structure according to an exemplary embodiment of the present disclosure.
Figure 3:
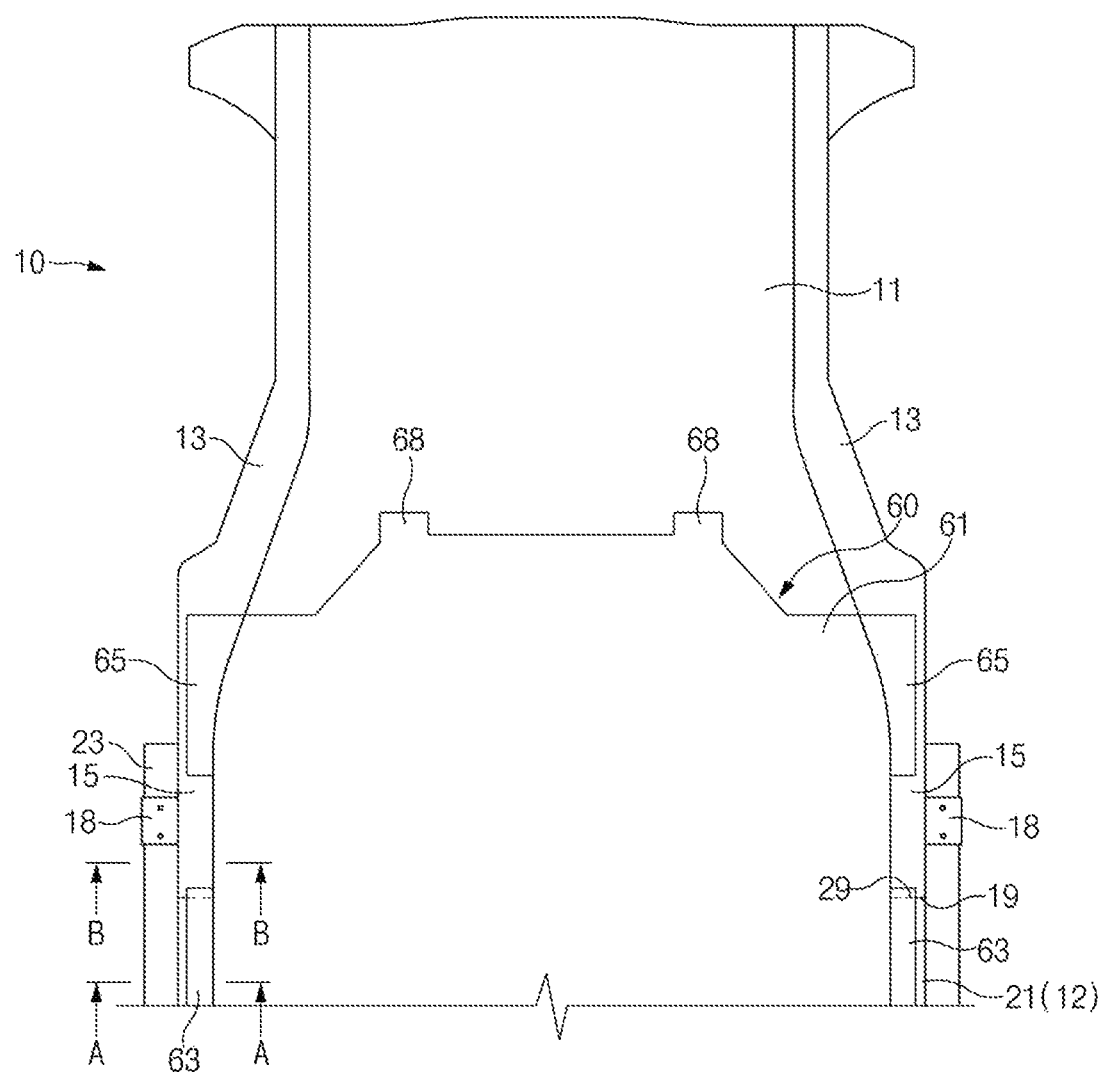
FIG. 3 illustrates a plan view of a vehicle rear structure according to an exemplary embodiment of the present disclosure.

Referring to FIGS. 1 and 2, a vehicle rear structure 10 according to an exemplary embodiment of the present disclosure may include a floor panel 11 disposed on the bottom of a vehicle body, a pair of side sills 12 disposed on both left and right sides of the floor panel 11, and a pair of rear side members 13 coupled to the pair of side sills 12, respectively.

The floor panel 11 may be disposed on the bottom of the vehicle body to form a floor of the vehicle body.

Each side sill 12 may extend in a longitudinal direction of the vehicle, and be mounted on a side edge of the floor panel 11. The pair of side sills 12 may be spaced apart from each other in a transverse direction of the floor panel 11. Each side sill 12 may include an inner side sill 21 and an outer side sill 22, and the inner side sill 21 and the outer side sill 22 may extend in the longitudinal direction of the vehicle. The inner side sill 21 may have a top flange 21a and a bottom flange 21b, and the outer side sill 22 may have a top flange 22a and a bottom flange 22b. The top flange 21a of the inner side sill 21 and the top flange 22a of the outer side sill 22 may be coupled by welding, using fasteners, and/or the like, and the bottom flange 21b of the inner side sill 21 and the bottom flange 22b of the outer side sill 22 may be coupled by welding, using fasteners, and/or the like.

Each rear side member 13 may have a front portion 15 coupled to a rear end of the side sill 12, and the front portion 15 of the rear side member 13 may be aligned with the inner side sill 21 of the side sill 12. The front portion 15 of the rear side member 13 may have the same cross section as that of the side sill 12. As a front end surface 19 of the rear side member 13 may be butted a rear end surface 29 of the inner side sill 21 of the side sill 12, the front end surface 19 of the rear side member 13 may be coupled or joined to the rear end surface 29 of the inner side sill 21 by various welding process such as butt welding, spot welding, flash welding.

Each side sill 12 may include a reinforcing member 23 mounted in the inside thereof. The reinforcing member 23 may be disposed between the inner side sill 21 and the outer side sill 22, and may be coupled to the inner side sill 21 by welding and/or the like. The reinforcing member 23 may be an extruded product extending in the longitudinal direction of the vehicle. Specifically, the reinforcing member 23 may extend in a longitudinal direction of the inner side sill 21 and a longitudinal direction of the rear side member 13, and the reinforcing member 23 may have a length extending from the inside of the inner side sill 21 of the side sill 12 to the inside of the front portion 15 of the rear side member 13. As illustrated in FIG. 1, a rear portion of the reinforcing member 23 may be coupled to the inside of the front portion 15 of the rear side member 13 through a bracket 18.

Figure 4:
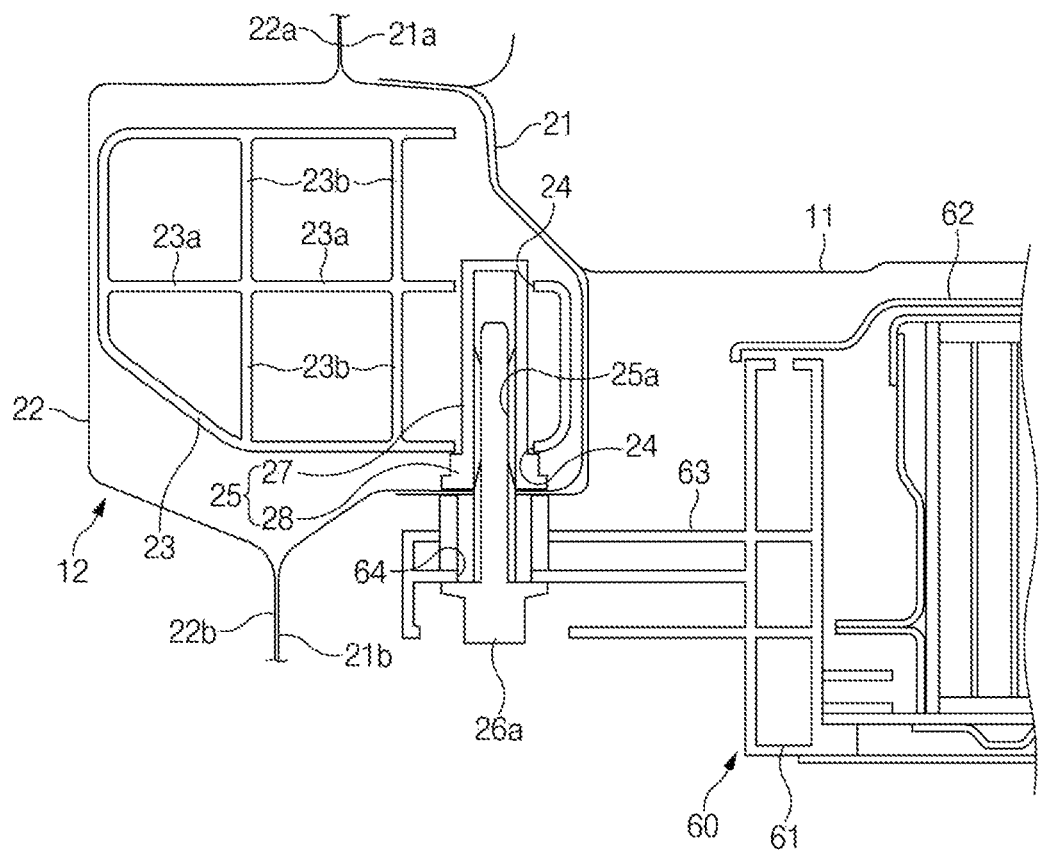
FIG. 4 illustrates a cross-sectional view taken along line A-A of FIG. 3.
Figure 5:
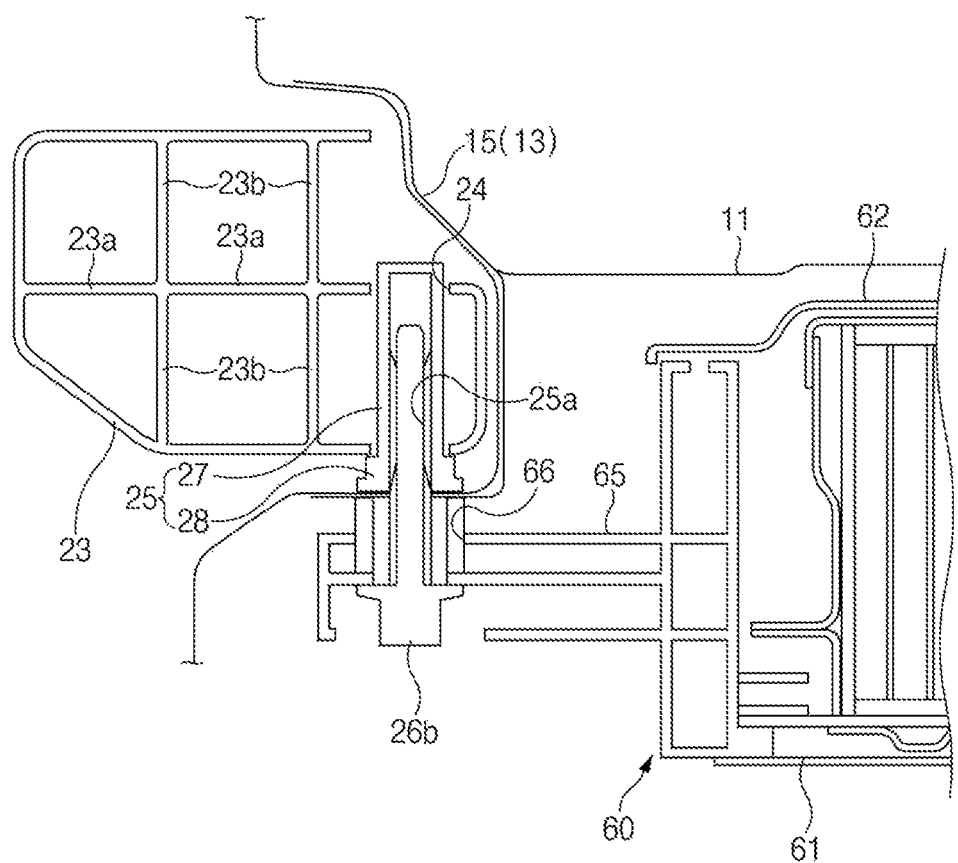
FIG. 5 illustrates a cross-sectional view taken along line B-B of FIG. 3.

Referring to FIGS. 4 and 5, the reinforcing member 23 may have a plurality of ribs 23a and 23b formed therein. The plurality of ribs 23a and 23b may include a plurality of horizontal ribs 23a and a plurality of vertical ribs 23b which are connected to each other.

Referring to FIGS. 4 and 5, the reinforcing member 23 may have a plurality of through holes 24, and a plurality of cylindrical nuts 25 may be individually coupled to the plurality of through holes 24 by welding and/or the like. The plurality of cylindrical nuts 25 may be aligned along the inner side sill 21 and the rear side member 13. Each cylindrical nut 25 may have a hollow cylindrical shape, and may have a female thread 25a to which each of bolts 26a and 26b is screwed. Each cylindrical nut 25 may include a cylindrical portion 27 passing through the through hole 24 of the reinforcing member 23, and a head portion 28 formed on a bottom end of the cylindrical portion 27. The cylindrical portion 27 may be coupled to the through hole 24 of the reinforcing member 23 by welding and/or the like, and the head portion 28 may be coupled to a bottom surface of the reinforcing member 23 adjacent to the through hole 24 by welding and/or the like. As the cylindrical nut 25 is coupled to the reinforcing member 23, the reinforcing member 23 may obtain enough stiffness in portions thereof to which the bolts 26a and 26b are fastened. Compared to the related art, stiffness may be secured and durability may be improved, which enables an increase in the weight of a battery assembly 60. Accordingly, a high-capacity battery assembly may easily be mounted, contributing to an increase in the range of an electric vehicle.

The battery assembly 60 may be disposed under the floor panel 11. The battery assembly 60 may include one or more battery cells (or a battery module), electrical components associated with the battery cells, a battery housing 61 in which the battery cells and the electrical components are mounted, and a cover 62 covering the top of the battery housing 61.

The battery housing 61 may have a plurality of side mountings 63 and 65 individually provided on both sides thereof. The plurality of side mountings 63 and 65 may include a first side mounting 63 extending toward the side sill 12, and a second side mounting 65 extending toward the rear side member 13.

In addition, the battery housing 61 may have a front mounting (not shown) provided on a front end thereof, and a rear mounting 68 provided on a rear end thereof.

Referring to FIG. 4, the first side mounting 63 may have a first through hole 64 through which a first bolt 26a passes, and the cylindrical nut 25 of the reinforcing member 23 located within the inner side sill 21 may be aligned with the first through hole 64. The first side mounting 63 may be located below the inner side sill 21 of the side sill 12, and the first bolt 26a may pass through the first through hole 64 of the first side mounting 63 and be fastened to the cylindrical nut 25 vertically aligned with the first through hole 64 so that the first side mounting 63 may be coupled to the inner side sill 21 of the side sill 12 and the reinforcing member 23.

Referring to FIG. 5, the second side mounting 65 may have a second through hole 66 through which a second bolt 26b passes, and the cylindrical nut 25 of the reinforcing member 23 located within the front portion 15 of the rear side member 13 may be aligned with the second through hole 66. The second side mounting 65 may be located below the rear side member 13, and the second bolt 26b may pass through the second through hole 66 and be fastened to the cylindrical nut 25 vertically aligned with the second through hole 66 so that the second side mounting 65 may be coupled to the rear side member 13 and the reinforcing member 23.

As set forth above, according to exemplary embodiments of the present disclosure, as the front portion of the rear side member has the same cross section as that of the inner side sill of the side sill, the front end surface of the rear side member may be coupled to the rear end surface of the inner side sill by butt welding and/or the like. Since impact energy generated in a rear impact is smoothly transmitted to the side sill through the rear side member, the impact energy may be smoothly dispersed or eliminated. This may reduce the deformation of the vehicle body, and improve rear crashworthiness in the rear impact.

In addition, according to exemplary embodiments of the present disclosure, the reinforcing member may be inserted into the inside of the inner side sill of the side sill and the inside of the rear side member, and the battery assembly may be coupled to the side sill through the reinforcing member and also be coupled to the rear side member through the reinforcing member so that the battery assembly may be firmed mounted on the vehicle body. This may significantly increase the stiffness and strength of the vehicle body.

Furthermore, according to exemplary embodiments of the present disclosure, the rear side member and the side sill having the same cross section may overlap and be coupled to each other, and the mounting of the battery assembly may be coupled to the reinforcing member disposed inside the side sill and the rear side member, which may allow the high-capacity battery assembly to be easily mounted on the vehicle body, reduce crash pulse severity, and improve NVH performance with the increased stiffness of the vehicle body.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle rear structure, comprising:
   a pair of side sills mounted on both sides of a floor panel;
   a pair of rear side members coupled to the pair of side sills, respectively; and
   a reinforcing member mounted in an inside of each side sill,
   wherein a front end of each rear side member is coupled to a rear end of each side sill, respectively,
   wherein each rear side member has a front portion aligned with the side sill,
   wherein the reinforcing member has a length extending from the inside of each side sill to an inside of the front portion of each rear side member, respectively,
   wherein a battery housing of a battery assembly is coupled to the pair of side sills and the reinforcing member by a first bolt, and
   wherein the battery housing of the battery assembly is coupled to the pair of rear side members and the reinforcing member by a second bolt.

2. The vehicle rear structure according to claim 1, wherein the battery housing includes a first side mounting extending toward a corresponding side sill, and a second side mounting extending toward a corresponding rear side member,
   the first side mounting is coupled to the corresponding side sill and the reinforcing member by the first bolt, and
   the second side mounting is coupled to the corresponding rear side member and the reinforcing member by the second bolt.

3. The vehicle rear structure according to claim 2, wherein the reinforcing member includes:
   a plurality of through holes; and
   a plurality of cylindrical nuts coupled to the plurality of through holes, respectively.

4. The vehicle rear structure according to claim 3, wherein the first side mounting has a first through hole through which the first bolt passes, and
   the first bolt passes through the first through hole and is fastened to a cylindrical nut aligned with the first through hole.

5. The vehicle rear structure according to claim 3, wherein the second side mounting has a second through hole through which the second bolt passes, and
   the second bolt passes through the second through hole and is fastened to a cylindrical nut aligned with the second through hole.

6. The vehicle rear structure according to claim 3, wherein each cylindrical nut includes a cylindrical portion extending through each through hole of the reinforcing member, and a head portion disposed on a bottom end of the cylindrical portion,
   the cylindrical portion is coupled to the through hole of the reinforcing member, and
   the head portion is coupled to a bottom surface of the reinforcing member adjacent to the through hole.

7. The vehicle rear structure according to claim 1, wherein the front portion of each rear side member has the same cross section as that of each side sill, respectively.

8. The vehicle rear structure according to claim 1, wherein the front end of each rear side member is butted and joined to the rear end of each side sill, respectively.

* * * * *